(12) United States Patent
Zhong et al.

(10) Patent No.: US 6,780,911 B2
(45) Date of Patent: Aug. 24, 2004

(54) LOW MOLECULAR WEIGHT POLYHYDROXYALKANOATE MOLDING COMPOSITIONS

(75) Inventors: Luhua Zhong, Woburn, MA (US); Robert S. Whitehouse, Lexington, MA (US)

(73) Assignee: Metabolix, Inc., Cambridge, MA (US)

( * ) Notice: Subject to any disclaimer, the term of this patent is extended or adjusted under 35 U.S.C. 154(b) by 189 days.

(21) Appl. No.: 09/933,610

(22) Filed: Aug. 21, 2001

(65) Prior Publication Data

US 2002/0043737 A1 Apr. 18, 2002

Related U.S. Application Data

(60) Provisional application No. 60/227,127, filed on Aug. 23, 2000.

(51) Int. Cl.$^7$ ............................. C08K 3/00; C08F 20/00

(52) U.S. Cl. ........................ 524/401; 524/174; 524/177; 524/178; 524/409; 524/413; 524/424; 524/425; 524/431; 524/432; 524/433; 524/434; 524/442; 524/445; 524/497; 524/539; 525/537; 525/444; 525/450

(58) Field of Search ................................. 524/174, 177, 524/178, 401, 409, 413, 424, 425, 431, 432, 433, 434, 442, 445, 497, 539; 525/437, 444, 450

(56) References Cited

FOREIGN PATENT DOCUMENTS

| WO | WO 94/11440 | * | 5/1994 |
| WO | WO 99/05209 | * | 2/1999 |
| WO | WO 99/32536 | * | 7/1999 |

OTHER PUBLICATIONS

De Smet et al., *Characterization of Intracellular Inclusions Formed by Pseudomonas oleovorans During Growth on Octane*, Journal of Bacteriology, p. 870–878 (May 1983).
Wallen et al., *Poly–β–hydroxyalkanoate from Activated Sludge*, Environmental Science & Technology, vol. 8, pp. 576–579, (Jun. 1974).
Steinbuchel et al., *A Pseudomonas strain accumulating polyesters of 3–hydroxybutyric acid and medium–chain–length 3–hydroxyalkanoic acids* Applied Microbiology and Biotechnology, pp. 691–697 (1992).
Valentin et al., *Identification of 4–hydroxyvaleric acid as a constituent of biosynthetic polyhydroxyalkanoic acids from bacteria*, Applied Microbiology and Biotechnology, pp. 507–514, (1992).
Valentin et al., *Identification of 4–hydroxyhexanoic acid as a new constituent of biosynthetic polyhydroxyalkanoic acids from bacteria*, Applied Microbiology and Biotechnology, pp. 710–716, (1994).

Lee et al., *Biosynthesis of copolyesters consisting of 3–hydroxybutyric acid and medium–chain–length 3–hydroxyalkanoic acids from 1,3–butanediol or from 3–hydroxybutyrate by Pseudomonas sp. A33*, Applied Microbiology and Biotechnology, pp. 901–909, (1995).
Kato et al., *Production of a novel copolyester of 3–hydroxybutyric acid and medium–chain–length 3–hydroxyalkanoic acids by Pseudomonas sp. 61–3 from sugars*, Applied Microbiology and Biotechnology, pp. 363–370, (1996).
Valentin et al., *Identification of 5–hydroxyhexanoic acid, 4–hydroxyheptanoic acid and 4–hydroxyoctanoic acid as new constituents of bacterial polyhydroxyalkanoic acids*, Applied Microbiology and Biotechnology, pp. 261–267, (1996).
Brandl et al., *Ability of the phototrophic bacterium Rhodospirillum rubrum to produce various poly (β–hydroxyalkanoates): potential sources for biodegradable polyesters*, Int. J. Biol. Macromol., vol. 11, pp. 49–55, (1989).
Amos et al., *Composition of poly–β–hydroxyalkanoate from Syntrophomonas wolfei grown on unsaturated fatty acid substrates*, Archives of Microbiology, pp. 103–105, (1991).
Byrom, D. *Miscellaneous Biomaterials*, ICI BioProducts and Fine Chemicals, pp. 335–359.
Hocking et al., *Biopolyesters*, pp. 48–96.
Lafferty et al., *Microbial Production of Poly–β–hydroxybutyric Acid*, Chapter 6, pp. 137–176.
Gross et al., *Polymerization of β–Monosubstituted–β–propiolactones Using Trialkylaluminum–Water Catalytic Sytems and Polymer Characterization*, Macromolecules, pp. 2657–2668, (1988).
Dubois et al., *Macromolecular Engineering of Polylactones and Polyactides*, Macromolecules, pp. 4407–4412, (1993).
Borgne et al., *Stereoelective polymerization of β–butyrolactone*, Polymer, vol. 30, pp. 2312–2319, (Dec. 1989).

(List continued on next page.)

Primary Examiner—Samuel A. Acquah
(74) Attorney, Agent, or Firm—Kilyk & Bowersox, P.L.L.C.

(57) ABSTRACT

Molding compositions including low molecular weight polyhydroxyalkanoates are provided. The use of the low molecular weight polyhydroxyalkanoates as a binder in molding compositions provides improved binder removal in the finished molded product, and offers a wide range of physical properties suitable for use in a variety of processing conditions. The composition preferably includes a powdered material, such as a metal powder, ceramic powder, or blend, admixed with a low molecular weight polyhydroxyalkanoate binder. The compositions are useful in powder processing techniques, such as injection molding, slip casting, tape casting, or extrusion. Methods of forming low molecular weight polyhydroxyalkanoates are also described.

67 Claims, No Drawings

OTHER PUBLICATIONS

Tanahashi et al., *Thermal Properties and Stereoregularity of Poly(3–hydroxybutyrate) Prepared from Optically Active β–Butyrolactone with a Zinc–Based Catalyst, Macromolecules*, vol. 24, pp. 5732–5733 (1991).

Hori et al., *Ring–Opening Copolymerization of Optically Active β–Butyrolactone with Several Lactones Catalyzed by Distannoxane Complexes: Synthesis of New Biodegradable Polyesters, Macromolecules*, vol. 26, pp. 4388–4390 (1993).

Kemnitzer, *Preparation of Predominantly Syndiotactic Poly (β–hydroxybutyrate) by the Tributyltin Methoxide Catalyzed Ring–Opening Polymerization of Racemic β–Butyrolactone, Macromolecules*, vol. 26, pp. 1221–1229, (1993).

Hori et al., *Ring–Opening Polymerization of Optically Active β–Butyrolactone Using Distannoxane Catalysts: Synthesis of High Molecular Weight Poly(3–hydroxybutyrate), Macromolecules*, vol. 26, pp. 5533–5534 (1993).

Hocking et al., *Syndiotactic poly[(R,S)–β–hydroxybutyrate] isolated from methylaluminoxane–catalyzed polymerization, Polymer Bulletin*, vol. 30, pp. 163–170 (1993).

Xie et al., *Ring–Opening Polymerization of β–Butyrolactone by Thermophilic Lipases, Macromolecules*, vol. 30, pp. 6997–6998 (1997).

Jesudason et al., *Synthetic Poly[(R,S)–β–hydroxyalkanoates] with Butyl and Hexyl Side Chains, Macromolecules*, vol. 27, pp. 2595–2602 (1994).

*Reports on Progress in Polymer Physics in Japan*, vol. 37, pp. 128–129 (1994).

Kharas et al., *Polymers of Lactic Acid* 94–137 (No date available).

Abe et al., *Biosynthesis from gluconate of a random copolyester consisting of 3–hydroxy–butyrate and medium–chain–length 3–hydroxyalkanoates by Pseudomonas sp. 61–3, Int. J. Biol. Macromol.*, vol. 16, pp. 36, 38, 40, (1994).

Muller et al., *Poly(hydroxyalkanoates): A Fifth Class of Physiologically Important Organic Biopolymers?, Angew. Chem. Int. Ed. Engl.*, vol. 32, pp. 477–502 (1993).

* cited by examiner

LOW MOLECULAR WEIGHT POLYHYDROXYALKANOATE MOLDING COMPOSITIONS

This application claims the benefit under 35 U.S.C. §119(e) of prior U.S. Provisional Patent Application No. 60/227,127 filed Aug. 23, 2000, which is incorporated in its entirety by reference herein.

BACKGROUND OF THE INVENTION

The present invention relates to compositions for forming molded articles, and more particularly to compositions including powdered forms of inorganic powders, glass, ceramics, or metals.

A variety of useful molded products having complex shapes and useful mechanical strengths can be made from powdered forms of ceramics, metals, metal oxides, thermoset resins, high melt temperature thermoplastics, and combinations thereof. Examples of these products include aerospace components, biomedical implants, bonded diamond abrasives, cutting tools, turbine blades and other mechanical parts, nozzles subject to continuous contact with abrasives, electronic devices, and superconductors. Forming techniques, such as slip casting, tape casting, extrusion, injection molding, dry pressing or compression molding, generally require the presence of a binder formulation that is mixed with the metal, ceramic, or mixed powder feed. The binder is a temporary vehicle to aid flow during the forming process, for homogeneously packing the powder into the desired shape and then for holding the particles in that shape until the beginning of sintering (German, "Powder Injection Molding," (Metal Powder Industries Federation, Princeton, N.J. 1990); German and Bose, "Injection Molding of Metals and Ceramics," (Metal Powder Industries Federation, Princeton, N.J. 1997)). Sintering or fusing of the powder components is needed, for example, to obtain physical properties for the finished item that are suitable for the conditions of its end use.

One disadvantage with using traditional binders in the shape formation is that the molded product's physical properties and performance can be impaired by residual amounts of binder or binder decomposition products, by uneven removal of binder or binder decomposition products, or by voids formed by removal of binder or binder decomposition products. (Residual binder is not a problem in the limited circumstances when it is desirable to incorporate binder components into the final form by chemical or interatomic attraction.) Many products made from ceramic powders, metal powders, and blends thereof are used in applications where they are exposed to repeated stresses. Examples of these products include combustion engine parts, valves, rotors, and gear assemblies. Inclusion bodies derived from inadequate removal of binder, or voids resulting from combustion gases during removal, can facilitate cracking and failure of the parts in service. Electrical conductivity is another important performance requirement, for example in electronic parts such as printed circuit boards and superconductors, that can be adversely affected by inadequate binder removal or void formation caused thereby. Therefore, removal of the binder used in shape formation is generally a crucial step in the powder processing technique.

Techniques for the removal of undesirable binders include (1) thermal evaporation; (2) thermal decomposition; (3) chemical transformation to forms useful in the end product; (4) solvent extraction; (5) supercritical extraction; (6) diffusion and absorption of binder constituents to an absorbing surface surrounding the shape or wicking; and (7) depolymerization by thermal means, catalytic means, or a combination thereof. Removal of the binder usually is the slowest step in the powder injection molding process (German, "Sintering Theory and Practice," (John Wiley & Sons, New York 1996); German and Bose, "Injection Molding of Metals and Ceramics," (Metal Powder Industries Federation, Princeton, N.J. 1997)). One binding system investigated for providing more rapid removal involves using polyacetals, particularly with injection molding processing, for example, as described in U.S. Pat. No. 5,155,158 to Kim and in WO 91/08993. The use of polyalkylene carbonates for use in such applications is disclosed in European Patent Application EP 0,463,769 A2. In theory, the polyacetal binders "unzip" or depolymerize, releasing formaldehyde, when exposed to nitric acid fumes in an incubator. Unfortunately, the use of nitric acid or other oxidants restricts the use of the polyacetal resins to those powders which are not susceptible to undesirable oxidation. Similarly, the polyalkylene carbonate binders "unzip" upon reaching a certain decomposition temperature, typically around 200° C. Other binder materials include polyoxalate and polymalonate polymers, which also are useful as rheological control agents in paste formulations, as described in U.S. Pat. No. 5,412,062 to Power et al. Polyalkylene carbonates, however, exhibit viscosity behavior that makes flow of the unformed metal/binder, ceramic/binder, or metal/ceramic/binder difficult.

The use of polyhydroxyalkanoates as binders in molding applications is disclosed in WO 99/05209. The approach describes the use of polymers recovered directly from a fermentation process without further modification; typically these polymers will have molecular weights measured by HPLC in the order of 100,000 to in excess of 1,000,000.

Many of the characteristics of materials and compositions useful as binders are described in Shanefield, "Organic Additives and Ceramic Processing," (Kluwer Academic Publishers, Boston 1996). Desirable features include (1) easy burnout, (2) strong adhesion to the powder and good cohesive strength, (3) solubility in fluidizing liquid, and (4) low cost. The binder material must be suitable for a variety of process conditions, since, for example, many powders must avoid exposure to air or water, or may require exposure to reducing gases or vacuum conditions, during processing.

All of the patents, patent applications, and publications mentioned throughout this application are incorporated in their entirety by reference herein and form a part of the present application.

It is therefore an object of this invention to provide molding compositions having improved binder removal characteristics.

It is another object of this invention to provide molding compositions suitable for use in a wide range of processing conditions.

SUMMARY OF THE INVENTION

Molding compositions including polyhydroxyalkanoates are provided. The use of polyhydroxyalkanoates as a binder in molding compositions provides improved binder removal in the finished molded product, and offers a wide range of physical properties suitable for use in a variety of processing conditions. The polyhydroxyalkanoate, in the present invention, preferably has a molecular weight that is less than about 70,000, and more preferably is from about 500 to 20,000, and most preferably, from about 500 to about 10,000. Other molecular weight ranges include from about 1,000 to 5,000, and from about 1,000 to about 3,000.The composition preferably includes a powdered material, such as a metal powder, ceramic powder, or blend, admixed with a polyhydroxyalkanoate binder. The compositions are useful in powder processing techniques, such as injection molding, compression molding, slip casting, tape casting, or extrusion. The compositions containing the low molecular weight polyhydroxyalkanoate preferably exhibit improved green strength and improved handling of green strength.

The present invention further relates to thermally decomposable polyhydroxyalkanoates having at least one of the terminal end groups, and preferably both of the terminal groups selected from:

a) —CO—CH=$CR^9R^{10}$;
b) —$OR^{11}$;
c) —$COOR^{12}$,
d) —$COR^{13}$; or
e) —$O^-M^+$ wherein $R^9$, $R^{10}$, $R^{11}$, $R^{12}$, or $R^{13}$ which are the same or different, represents saturated or unsaturated hydrocarbon radicals, halo- or hydroxy-substituted radicals, hydroxy radicals, nitrogen-substituted radicals, oxygen-substituted radicals, or a hydrogen atom, with the proviso that $R^{11}$ is not a hydrogen atom. $M^+$ is a counter ion. Preferably, both of the terminal end groups of the PHA are selected from one of the above-described terminal end groups a)–e) wherein the terminal end groups can be the same or different. Alternatively, the PHA can have one of the above-described terminal end groups a)–e) and the other end group can end with hydrogen or —OH. Preferably, when the terminal end group is —$OR^{11}$, or —$COR^{13}$, the other end group is not —OH. These thermally decomposable polyhydroxyalkanoates can have any molecular weight such as from about 500 to about 1.5 million. More preferably, the molecular weight is from about 500 to about 100,000, more preferably from about 500 to less than 70,000, such as from about 500 to about 10,000. These polyhydroxyalkanoates can be polymers, oligomers, or monomers.

The present invention further relates to a method to make thermally decomposable polyhydroxyalkanoates having low molecular weights which involves the hydrolysis or thermolysis of a polyhydroxyalkanoate under such conditions that will lead to a low molecular weight thermally decomposable polyhydroxyalkanoate or an oligomer thereof, or a monomer thereof.

It is to be understood that both the foregoing general description and the following detailed description are exemplary and explanatory only and are intended to provide further explanation of the present invention, as claimed.

DETAILED DESCRIPTION OF THE INVENTION

Polyhydroxyalkanoate binders for use in molding compositions are provided, preferably for use in metal powder, ceramic powder, or metal/ceramic powder processing.

The molding compositions generally include one or more powdered materials and one or more polyhydroxyalkanoates or a solution thereof. The compositions may include additional (optional) components to enhance processing or properties of the end product.

The powdered material for purposes of the present invention can be an inorganic material, such as a powder. Examples include, but are not limited to, glasses, ceramics, metals, alloys, thermoplastic polymers, thermoset polymers, and combinations thereof. Metal powder, ceramic powder, and blends of metal and ceramic powder are preferred.

Powder materials useful in the molding compositions disclosed herein are described in German, "Powder Injection Molding," (Metal Powder Industries Federation, Princeton, N.J. 1990) and German and Bose, "Injection Molding of Metals and Ceramics," (Metal Powder Industries Federation, Princeton, N.J. 1997). Preferably, the inorganic powder or metal material contains iron, steel, chromium, copper, nickel, tungsten, aluminum, titanium, silicon oxide, silicon carbide, barium titanate, aluminum hydroxide, alumina, wollastonite, silica, silicon nitride, or aluminum nitride or combinations thereof.

The term "powdered" as used throughout this disclosure refers to the form of the material prior to mixing it into the composition to be molded, and is understood to include microparticles, microspheres, nanoparticles, flakes, fibers, strands, and any material that can be molded with binders including other particles of a size suitable for molding into larger products.

The amount of powdered material present in the molding composition preferably is from about 50 wt % to about 99.999 wt %, and more preferably from about 70 wt % to about 99.999 wt %, and even more preferably from about 85 wt % to about 99.9 wt % of the total dry weight of the composition. The particular material, form of the material, and fraction of material present in the composition can be readily selected by those of skill in the art based, for example, on the desired physical properties of the end product and the particular molding process to be employed.

Several types of polyhydroxyalkanoates (PHAs) are known. It is useful to broadly divide the PHAs into two groups according to the length of their side chains and according to their pathways for biosynthesis. Those with short side chains, such as polyhydroxybutyrate (PHB), a homopolymer of R-3-hydroxybutyric acid units, are crystalline thermoplastics; PHAs with long side chains are more elastomeric. The former polymers have been known for about seventy years (Lemoigne & Roukhelman 1925), while the latter polymers are a relatively recent discovery (deSmet, et al., *J. Bacteriol.*, 154:870–78 (1983)). Before this designation, however, PHAs of microbial origin containing both R-3-hydroxybutyric acid units and longer side chain units from C5 to C 16 were identified (Wallen & Rowheder, *Environ. Sci. Technol.*, 8:576–79 (1974)). A number of bacteria which produce copolymers of D-3-hydroxybutyric acid and one or more long side chain hydroxyacid units containing from five to sixteen carbon atoms have been identified more recently (Steinbuchel & Wiese, *Appl. Microbiol. Biotechnol.*, 37:691–97 (1992); Valentin et al, *Appl. Microbiol. Biotechnol.*, 36: 507–14 (1992); Valentin et al., *Appl. Microbiol. Biotechnol.*, 40:710–16 (1994); Abe et al., *Int. J. Biol. Macromol.*, 16:115–19 (1994); Lee et al., *Appl. Microbiol. Biotechnol.*, 42:901–09 (1995); Kato et al., *Appl. Microbiol. Biotechnol.*, 45:363–70 (1996); Valentin et al., *Appl. Microbiol. Biotechnol.*, 46:261–67 (1996); U.S. Pat. No. 4,876,331 to Doi). Useful examples of specific two-component copolymers include PHB-co-3-hydroxyhexanoate (Brandl et al., *Int. J. Biol. Macromol.*, 11:49–55 (1989); Amos & McInerey, *Arch. Microbiol.*, 155:103–06 (1991); U.S. Pat. No. 5,292,860 to Shiotani et al.). Chemical synthetic methods have also been applied to prepare racemic PHB copolymers of this type for applications testing (WO 95/20614, WO 95/20615, and WO 96/20621). Accordingly, the PHAs used in the present invention can be produced by a microbial fermentation process, by a genetically engineered plant crop system, and/or by a chemical polymerization reaction, such as a ring opening polymerization.

As PHAs have become increasingly available, they have been examined for their suitability in applications where they serve as a processing aid. For example, the use of PHA latex film in the production of CRT tube components is described in WO 96/17369.

For purposes of the present invention, the molecular weight of the PHAs is preferably from about 500 to under 70,000, and more preferably from about 500 to about 20,000, and most preferably from about 500 to about 10,000 Daltons. In one embodiment of the present invention, the molecular weight of the PHAs is less than 10,000 and preferably from about 500 to about 9,500 or lower. Another suitable molecular weight range for purposes of the present invention is from about 500 to about 5,000, or from about 500 to about 1,000. The PHAs preferably contain one or more units of the following formula:

$$—OCR^1R^2(CR^3R^4)_nCO— \qquad (I)$$

wherein n is 0 or an integer for instance from 1 to 2,000; and wherein $R^1$, $R^2$, $R^3$, and/or $R_4$ are independently selected from saturated and unsaturated hydrocarbon radicals, halo- and hydroxy-substituted radicals, hydroxy radicals, halogen radicals, nitrogen-substituted radicals, oxygen-substituted radicals, and hydrogen atoms. Preferably n is from 0 to 5 and more preferably from 1 to about 3. Examples of $R^1$, $R^2$, $R^3$ and/or $R^4$ include, but are not limited to, hydrogen, methyl, ethyl, propyl, butyl, pentyl, hexyl, heptyl, octyl, pentyl, and the like.

Suitable monomeric units include hydroxybutyrate, hydroxyvalerate, hydroxyhexanoate, hydroxyheptanoate, hydroxypropanoate, hydroxyoctanoate, hydroxynonanoate, hydroxydecanoate, hydroxyundecanoate, and hydroxydodecanoate units. PHAs including monomers and polymers (homopolymers, copolymers, and the like) and derivatives of 3-hydroxyacids, 4-hydroxyacids, 5-hydroxyacids, polylactic acid, and polyglycolic acid, or combinations thereof can be used. Representative PHAs are described in Steinbüchel & Valentin, *FEMS Microbiol. Lett.*, 128:219–28 (1995).

Preferred PHAs include, but are not limited to, polyhydroxybutyrate; a copolymer of hydroxybutyric acid and hydroxyvaleric acid (e.g., a copolymer of 60–99 weight % hydroxy butyric acid and 1–40 weight % hydroxyvaleric acid); a copolymer of 3-hydroxybutyric acid and 4-hydroxybutyric acid (e.g., a copolymer of 60–99 weight % hydroxy butyric acid and 1–40 weight % 4-hydroxybutyric); polyhydroxyoctanoate; a copolymer containing hydroxyoctonate groups randomly distributed through the polymer chain (e.g., at least 10 % by molar mass hydroxyoctanoate groups randomly distributed through the polymer chain of a copolymer); and combinations thereof. Specific examples include poly(3-hydroxybutyrate), poly 3-hydroxybutyrate-co-3-hydroxyvalerate, poly 3-hydroxybutyrate-co-4-hydroxybutyrate, poly 3-hydroxybutyrate-co-3-hydroxyhexanoate, poly 3-hydroxybutyrate-co-3-hydroxyheptanoate, or poly 3-hydroxybutyrate-co-3-hydroxyoctanoate. The polyhydroxyalkanoate can also have end chain functionalities such as groups selected from vinyl; carboxylic acid; carboxylic acid ester; acetate; butyrate; propanoate; primary, secondary, or tertiary alcohol; amide; and/or a polyhydric alcohol.

Also, the PHAs can be a mixture of thermally degradable polyhydroxyalkanoates. The composition of the present invention can also further contain at least one thermally degradable polymer other than polyhydroxyalkanoate, for example, polycarbonates, polyolefins, polystyrenes, polyacetals, waxes, or combinations thereof.

The PHA can also have the formula $R^5CH{=}CH(CH_2)_{n-1}CO[OCHR^6(CH_2)_nCO]_pOH$. Alternatively, the PHA can have the formula $H[OCHR^7(CH_2)_nCO]_pOR'$. Further, the PHA can have the formula $R''CO[OCHR^8(CH_2)_nCO]_pOH$. The PHA can also be a block polymer containing polyhydroxyalkanoate segments and at least one polyalkylene glycol segment. Preferably, for such a PHA, the block polymer preferably contains at least 20 weight % of a PHA segment and at least one polyalkylene glycol segment selected from one or more repeat units of ethylene oxide, propylene oxide, butylene oxide, or mixtures thereof. In the above formulas, p is from 5 to 1000, n is 0 or an integer, R' is derived from a monohydric alcohol or a polyhydric alcohol, such as methyl-styryl, and R" is derived from a carboxylic acid having 1 to 20 carbon atoms, such as methyl-styryl, $R^5$, $R^6$, $R^7$, and $R^8$ can represent saturated or unsaturated hydrocarbon radicals; halo, hydroxy, oxygen or nitrogen substituted radicals; or hydrogen atoms, such as H, $CH_3$, $C_2H_5$, or is $C_3H_7$, $C_4H_9$, $C_5H_{11}$.

The PHA in the composition of the present invention can be dispersed in water or dissolved in a solvent or a mixture of solvents.

In another embodiment, thermally decomposable polyhydroxyalkanoates, which can be used in the compositions of the present invention, can have at least one of the terminal end groups selected from:

a) $—CO—CH{=}CR^9R^{10}$;

b) $—OR^{11}$;

c) $—COOR^{12}$, d) $—COR^{13}$; or e) $—O^-M^+$ wherein $R^9$, $R^{10}$, $R^{11}$, $R^{12}$, or $R^{13}$ which are the same or different, represents saturated or unsaturated hydrocarbon radicals, halo- or hydroxy-substituted radicals, hydroxy radicals, nitrogen-substituted radicals, oxygen-substituted radicals, or a hydrogen atom, with the proviso that $R^{11}$ is not a hydrogen atom. $M^+$ is a counter ion, such as, but not limited to, ammonium, and metal counter ions, like sodium, potassium, zinc, calcium, and the like. Preferably, both of the terminal end groups of the PHA are selected from one of the above-described terminal end groups a)–e) wherein the terminal end groups can be the same or different. Alternatively, the PHA can have one of the above-described terminal end groups a)–e) and the other terminal end group can be hydrogen or —OH. Preferably, when the terminal end group is $—OR^{11}$, or $—COR^{13}$, the other end group is not —OH. These various terminal end groups can be the terminal end groups for the PHA formula (I) set forth and described above. These thermally decomposable polyhydroxyalkanoates can have any molecular weight such as from about 500 to about 1.5 million Daltons. More preferably, the molecular weight is from about 500 to about 100,000, more preferably from about 500 to less than 70,000, such as from about 500 to about 20,000, or less than 10,000, such as from about 500 to about 9,000. These polyhydroxyalkanoates can be polymers, oligomers, or monomers.

Preferred PHAs of the present invention include the following formulas wherein the various variables are as described above.

$H(OCHRCH_2CO)_nOH$ $H(OCHRCH_2CO)_nOR'$ where R' is preferably an alkyl group or substituted alkyl group (e.g. diol, polyol, etc)

$H(OCHRCH_2CO)_nO^-M^+$ where M is preferably selected from ammonium, sodium, potassium, zinc, calcium $R''CO(OCHRCH_2CO)_nOH$ where R" is preferably the alkyl group from an aliphatic carboxylic acid R"CO(OCHRCH$_2$CO)$_n$OR' where R" is preferably the alkyl group from an aliphatic carboxylic acid and R' is preferably an alkyl group or substituted alkyl group (e.g. diol, polyol etc)

R"CO(OCHRCH$_2$CO)$_n$O$^-$M$^+$ where R" is preferably the alkyl group from an aliphatic carboxylic acid and M is preferably selected from ammonium, sodium, potassium, zinc, calcium.

The PHAs can be prepared from a biological source such as a microorganism which naturally produces the PHAs or which can be induced to produce the PHAs by manipulation of culture conditions and feedstocks, or microorganisms or a higher organism such as a plant, which has been genetically engineered so that it produces PHAs.

Methods which can be used for producing PHA polymers from microorganisms which naturally produce polyhydroxyalkanoates are described in U.S. Pat. No. 4,910,145 to Holmes, et al.; Byrom, "Miscellaneous Biomaterials" in *Biomaterials* (Byrom, ed.) pp. 333–59 (MacMillan Publishers, London 1991); Hocking and Marchessault, "Biopolyesters" in *Chemistry and Technology of Biodegradable Polymers* (Griffin, ed.) pp. 48–96 (Chapman & Hall, London 1994); Holmes, "Biologically Produced (R)-3-hydroxyalkanoate Polymers and Copolymers" in Developments in *Crystalline Polymers* (Bassett, ed.) vol. 2, pp. 1–65 (Elsevier, London 1988); Lafferty et al., "Microbial Production of Poly-b-hydroxybutyric acid" in *Biotechnology* (Rehm & Reed, eds.) vol. 66, pp. 135–76 (Verlagsgesellschaft, Weinheim 1988); Müller & Seebach, *Angew. Chem. Int. Ed. Engl.* 32:477–502 (1993).

Methods for producing PHAs in natural or genetically engineered organisms are described by Steinbüchel, "Polyhydroxyalkanoic Acids" in *Biomaterials* (Byrom, ed.) pp. 123–213 (MacMillan Publishers, London 1991); Williams & Peoples, *CHEMTECH*, 26:38–44 (1996); Steinbüchel & Wiese, *Appl. Microbiol. Biotechnol.*, 37:691–97 (1992); U.S. Pat. Nos. 5,245,023; 5,250,430; 5,480,794; 5,512,669; 5,534,432 to Peoples and Sinskey; Agostini et al., *Polym. Sci., Part A-1*, 9:2775–87 (1971); Gross et al., *Macromolecules*, 21:2657–68 (1988); Dubois, et al, *Macromolecules*, 26:4407–12 (1993); Le Borgne & Spassky, *Polymer*, 30:2312–19 (1989); Tanahashi & Doi, *Macromolecules*, 24:5732–33 (1991); Hori et al, *Macromolecules*, 26:4388–90 (1993); Kemnitzer et al., *Macromolecules*, 26:1221–29 (1993); Hori et al., *Macromolecules*, 26:5533–34 (1993); Hocking & Marchessault, Polym. Bull., 30:163–70 (1993); Xie et al., Macromolecules, 30:6997–98 (1997); and U.S. Pat. No. 5,563,239 to Hubbs et al. Other polymer synthesis approaches including direct condensation and ring-opening polymerization of the corresponding lactones are described in Jesudason & Marchessault, *Macromolecules* 27:2595–602 (1994); U.S. Pat. No. 5,286,842 to Kimura; U.S. Pat. No. 5,563,239 to Hubbs et al.; U.S. Pat. No. 5,516,883 to Hori et al.; U.S. Pat. No. 5,461,139 to Gonda et al.; and Canadian Patent Application No. 2,006,508. WO 95/15260 describes the manufacture of PHBV films, and U.S. Pat. Nos. 4,826,493 and 4,880,592 to Martini et al. describe the manufacture of PHB and PHBV films. U.S. Pat. No. 5,292,860 to Shiotani et al. describes the manufacture of the PHA copolymer poly(3-hydroxybutyrate-co-3-hydroxyhexanoate).

The low molecular weight PHAs can be prepared, for instance, by first using a PHA of a higher molecular weight such as greater than 70,000 or 80,000. This PHA having the higher molecular weight can then be subjected to an acid hydrolysis which will result in a lower molecular weight PHA. The acid hydrolysis preferably occurs in the presence of an alcohol, a diol, or a polyhydric alcohol, or combinations thereof. The preferred conditions for the acid hydrolysis and the preferred amounts of the components in this reaction which reduces the molecular weight of the PHA are as follows. The acid hydrolysis of the PHA can be done in the presence of alcohol, diol, thiol or polyols (or polyhydric alcohol). When an excess amount of alcohol, diol, thiol or polyol is used, the PHA will result in a low molecular weight PHA, such as an oligomer, with hydroxyl groups in both terminal positions. The reaction conditions are controlled such that preferably at least 1% by weight residual alcohol, diol, thiol, or polyol remains in the reaction product. For example, the controlled hydrolysis of polyhydroxybutyrate in the presence of ethylene glycol or 1,4 butane diol produces oligomers with the structure:

For ethylene glycol:

and for 1,4 butane diol:

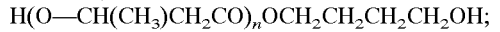

wherein n is preferably from about 2 to about 50.

If an excess of an alcohol is used in the hydrolysis process then a hydroxy ester is obtained, which for polyhydroxybutyrate in the presence of methanol, would have the structure:

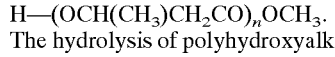

The hydrolysis of polyhydroxyalkanoates can occur in the presence of a strong acid catalyst such as sulfuric acid, hydrochloric acid or phosphoric acid; the most preferable being sulfuric or hydrochloric acids. The resultant oligomers contain a terminal hydroxyl and carboxylic acid groups. If the reaction is carried out in the presence of a strong acid catalyst and an alcohol, then the oligomers will have a terminal hydroxyl and ester groups. If the reaction is carried out in the presence of a strong acid catalyst and a carboxylic acid, then the oligomers will have an ester group generated from the carboxylic acid and the hydroxyl group on the oligomers, and a free carboxylic acid.

While the acid hydrolysis reaction can occur under ambient temperatures, elevated temperatures are normally utilized to increase the reaction rate. For the acid hydrolysis of polyhydroxyalkanoates, the most preferable reaction temperature conditions are from about 70° C. to about 140° C. In an embodiment of the present invention, acid hydrolysis reactions occurring above 140° C. typically have a mixture of terminal hydroxyl and vinyl groups as well as the free acid or ester group.

The low molecular weight PHA can also be prepared by the thermolysis of a higher molecular weight PHA such as one having a molecular weight of greater than about 80,000. The thermolysis conditions can be as follows. Alkenoic acids can be obtained in high yield by the thermal treatment of polyhydroxyalkanoates at sufficient temperatures, such as from about 195° C. and about 250° C. at atmospheric pressure for a sufficient period, such as from about 15 seconds to about 4 hours. Under these reaction conditions, the dried biomass (e.g., spray dried biomass) containing inorganic salts, the dried biomass washed free of water soluble salts, or the purified polymer all yield conversions to the alkenoic acid of >80% based on the polyhydroxyalkanoate content, and more preferably a yield of from about 85% to about 95%. Similar yields are obtainable with acid hydrolysis. Preferably, an inert gas such as nitrogen and/or a reducing atmosphere is used during the heat treatment step to minimize side reactions and optimize the yield of alkenoic acid. In a similar manner, if the nitrogen gas is partially replaced with an alcohol vapor then the alkenoic acid ester is generated in situ.

Where the polyhydroxyalkanoate produced microbially is a copolymer then a mixture of alkenoic acids are generated under the described thermal treatment. These may be separated into their individual alkenoic acid or ester derivatives by conventional fractional distillation either under ambient conditions or vacuum.

When the thermal treatment or heat profile is carried out under vacuum then the predominant yield is changed to a mixture of dimer, trimer and/or tetramer of the alkenoic acid. Further, if the temperature is reduce to 180° C. to 220° C., then oligomeric species having terminal vinyl and carboxylic acid groups can be obtained; the molecular weight being controlled by the residence time at this temperature. These oligomers have the generic structure: $RCH=CH(CH_2)_nCO[OCHR(CH_2)_nCO]_mOH$ where n=1 to 8, R represents an alkyl group having from 1 to 18 carbon atoms, and m=0 to 100.

While crotonic acid has previously been used as a comonomer in bulk, solution, and emulsion polymerization processes, higher alkenoic acid derivatives have not been used. Higher alkyl substituted 2 alkenoic acids offer an acid functionality in a similar manner to acrylic, methacrylic, and crotonic acids, however they are expected to offer increased hydrophobicity from the longer alkyl chain. Free radical generated polymers containing these higher alkenoic acid monomers preferably lead to increased water resistance, scrub resistance, and/or low surface free energy than those containing crotonic acid. The alkyl group would be expected to have an impact on the glass transition temperature of the resultant polymer; as the number of carbon atoms in the alkyl chain increases, then the glass transition temperature (Tg) of the polymer will decrease. Hence these higher alkenoic acids derivatives can produce dual functionality, i.e., adhesion or crosslinking through the acid/ester group and hydrophobicity/Tg reduction through the alkyl group.

Other manners in which the lower molecular weight PHAs can be obtained include, but are not limited to, synthetic polymerization by such methods as condensation of the hydroxy acids.

A number of features of the polyhydroxyalkanoate polymers make them particularly attractive as binders for metal powder, ceramic powder or metal/ceramic powder processing. PHA binder formulations can be prepared using PHAs in their solid form, in a latex form, or in solution, for example, dissolved in a solvent such as acetone. PHAs can be plasticized and blended with other polymers or agents.

A variety of PHAs, having a wide range of polymer physical properties, can be produced, depending on the hydroxyacid monomer composition used (Steinbuchel & Valentin, *FEMS Microbiol. Lett.*, 128:219–28 (1995)). The range of properties include, for example, melting temperatures between about 40° C. and 180° C., glass transition temperatures between about −55° C. to 5° C., degrees of crystallinity between about 0% and 80%, and elongation to break between about 5 and 500%. The rate of crystallization can be controlled. Polyhydroxybutyrate, for example, has characteristics similar to those of polypropylene, while polyhydroxyoctanoates (a copolymer of D-3-hydroxyoctanoate and D-3-hydroxyhexanoate) and poly-D-4-hydroxybutyrate behave more as elastomers, and PHAs with longer side chains have characteristics similar to waxes. The range of PHA polymers available with melting temperatures ranging from 40° C. to 180° C. provides additional flexibility in shape formation. As the molecular weight is reduced, the Tg remains relatively constant however the $T_m$ is reduced. At low molecular weights (<10,000), the end chain units start to have an impact on physical properties.

PHAs can exist in at least two distinct physical forms, as amorphous granules or as crystalline solids. The tendency of the PHAs to crystallize in terms of both final degree of crystallinity and rates of crystallization also varies with composition. PHA polymers offering rapid crystallization can be used for high green strength. These would include, for example PHB and PHBV, with the latter copolymer exhibiting the unique feature of isodimorphism. Where higher malleability is desired, PHOs and other longer pendant group types could be used. This polymer class has a lower glass transition temperature, around −35° C. as compared to 5° C. for the PHB homopolymer, allowing them to be formulated as self lubricating. This in turn reduces the need for other additives to obtain suitable flow characteristics for the mixture fed to the shaping system.

One particularly useful form is as a latex of PHA in water. Evaporation of the water as the shapes are molded results in film formation as the PHA granules coalesce providing excellent binding. The PHAs are readily removed by thermal decomposition during the subsequent thermal processing of the shaped parts. The range of PHA polymers available with melting temperatures ranging from 40° C.–180° C. provides additional flexibility in shape formation.

The monomer compositions can also affect solubility in organic solvents, allowing the choice of a wide range of solvents. Copolymers of D-3-hydroxybutyrate and other hydroxyacid co-monomers have significantly different solubility characteristics from those of the PHB homopolymer. For example, acetone is not a good solvent for PHB but is very useful for dissolving D-3-hydroxybutyrate copolymers with D-3-hydroxyacids containing from 6 to 12 carbon atoms (Abe et al., *Int. J. Biol. Macromol.* 16:115–19 (1994); Kato et al., *Appl. Microbiol. Biotechnol.*, 45:363–70 (1996)). Mitomo et al., *Reports on Progress in Polymer Physics in Japan*, 37:128–29 (1994), describes the solubility of copolyesters poly(3-hydroxybutyrate-co-4-hydroxybutyrate, containing from 15 to 75 mol. % 4-hydroxybutyrate residues, in acetone. A number of other solvents suitable for a range of PHAs are described in U.S. Pat. No. 5,213,976 to Blauhut et al.; U.S. Pat. No. 4,968,611 to Traussnig; Japan Kokai Tokkyo Koho JP 95,135,985; Japan Kokai Tokkyo Koho JP 95,79,788; WO 93/23554; DE 19533459; WO 97/08931; and Brazil Pedido PI BR 93 02,312.

PHAs can be plasticized and blended with other polymers or agents. Other, non-microbial, polymers having structures and decomposition temperatures similar to polyhydroxyalkanoates include polylactide (PLA) and polyglycolide (PGA). These polymers can be used in combination with or in place of PHA binders. The production and use of PLA are described extensively by Kharas et al., "Polymers of Lactic Acid" in *Plast. Microbes* (Mobley, ed.) pp. 93–137 (Hanser, Munich, Germany (1994)). The ester oxygens of these polymers, PHAs, PLA, PGA, are polar and provide good bonding between the binder and the powder materials.

Binders used in molding compositions frequently include a blend of other components, such as lubricants, plasticizers, and adhesion agents. The PHA molding compositions disclosed herein can also include such additives. It is also understood that certain PHAs may be used in place of such additives in other compositions.

Preferred compositions include a metal powder comprising iron, steel, copper, nickel, tungsten, or combinations thereof and the polyhydroxybutyrate comprises poly 3 hydroxybutyrate or a copolymer of 3 hydroxy butyrate with 3 hydroxyvalerate or 4 hydroxybutyrate, or wherein the powdered material is a ceramic powder comprising barium titanate, aluminum hydroxide, alumina, wollastonite, silica, or combinations thereof and the polyhydroxybutyrate comprises poly 3 hydroxybutyrate or a copolymer of 3 hydroxy butyrate with 3 hydroxyvalerate or 4 hydroxybutyrate.

In general, the compositions, for instance, the molding compositions, of the present invention can be used to form a shaped product. The method involves molding a composition containing a powdered material as described above which is admixed with at least one thermally decomposable polyhydroxyalkanoates as described above or a solution thereof to form the shaped product. The method can further involve heating the shaped product to remove essentially all of the polyhydroxyalkanoates from the product as described herein. The present invention further involves a molded article formed by the method described above. A preferred molding composition contains 70 wt % to about 99.9 wt % of an inorganic material, as described above, and from about 0.1 to about 30 wt % of at least one polyhydroxyalkanoate as described above. A preferred formula of a polyhydroxyalkanoate is one having a molecular weight from 500 to less than 70,000 with the chemical formula: —$OCR^1R^2(CR^3R^4)_nCO$—where n is 0 or an integer, and wherein $R^1, R^2, R^3$, and $R^4$, which are the same or different, are selected from saturated or unsaturated hydrocarbon radicals; halo, hydroxy, oxygen or nitrogen substituted radicals, or hydrogen atoms. Preferably, the polyhydroxyalkanoate is a polyhydroxybutyrate. More preferably, the polyhydroxyalkanoate is a copolymer of 60–99 wt % 3-hydroxybutyric acid and 1–40 wt % 3-hydroxyvaleric acid, or a copolymer of 60–99 wt % 3-hydroxybutyric acid and 1–40 wt % 4-hydroxybutyric acid, or is poly 3-hydroxyoctanoate. Also, the polyhydroxyalkanoate can be a copolymer containing at least 10 wt % by molar mass hydroxyoctanoate groups randomly distributed through the polymer chain. In addition, the polyhydroxyalkanoate can have the structure $H[OCHR^7(CH_2)_nCO]_pOR'$, wherein R' is derived from a monohydric alcohol or a polyhydric alcohol and wherein p is from 5 to 1000, n is 0 or an integer, and $R^7$ is selected from saturated or unsaturated hydrocarbon radicals; halo, hydroxy, oxygen or nitrogen substituted radicals, or hydrogen atoms, or the polyhydroxyalkanoate can have the structure $R''CO[OCHR^8(CH_2)_nCO]_pOH$, wherein R'' is derived from a carboxylic acid having 1 to 20 carbon atoms and wherein p is from 5 to 1000, n is 0 or an integer, and $R^8$ is selected from saturated or unsaturated hydrocarbon radicals; halo, hydroxy, oxygen or nitrogen substituted radicals, or hydrogen atoms, or the polyhydroxyalkanoate has the structure $R^5CH=CH_2(CH_2)_{n-1}CO[OCHR^6(CH_2)_nCO]_pOH$, where p is from 5 to 1000, n is 0 or an integer, and $R^5$ and $R^6$, which are the same or different, is selected from saturated or unsaturated hydrocarbon radicals; halo, hydroxy, oxygen or nitrogen substituted radicals, or hydrogen atoms. Also, polyhydroxyalkanoate can be a block polymer containing at least 20 wt % of a polyhydroxyalkanoate segment and at least one polyalkylene glycol segment where the polyalkylene glycol is selected from one or more repeat units of ethylene oxide, propylene oxide or butylene oxide or mixtures of ethylene oxide, propylene oxide and/or butylene oxide.

The PHA molding compositions can be used in forming techniques known in the art. The de-binding step described below can be adapted for use with these techniques as needed for the particular process, material, and product.

The PHA molding compositions can be used in forming techniques known in the art. These techniques include slip casting, tape casting, extrusion, injection molding, dry pressing and screen printing. These and other powder processing techniques are described in German, "Powder Injection Molding," (Metal Powder Industries Federation, Princeton, N.J. 1990) and German and Bose, "Injection Molding of Metals and Ceramics," (Metal Powder Industries Federation, Princeton, N.J. 1997). Extrusion and injection molding are preferred processes for use with the compositions described herein. One of skill in the art can adapt known forming techniques for use with the PHA molding compositions disclosed herein.

The de-binding step preferably includes heating the shaped powder compact to a temperature approaching the decomposition temperature of the polyesters, which is remarkably constant for the PHAs despite varying pendant groups, so that temperature control experience is widely applicable over a range of PHA formulations. The decomposition involves formation of crotonic acid and its homologues. Careful application of heat leading to slightly higher temperatures on the outside of the shaped powder compact causes the PHA powder to decompose so that degassing channels can be formed and subsequent processing can take place without deformation or void formation of the shape due to gas trapping.

In the case of PHAs containing unsaturated monomers, the alkenoic acids can be destroyed by thermal catalytic systems, by combustion, or a combination thereof. The need for air inflow, oxygen, or other oxidants is eliminated or reduced through the use of PHA binders, thereby reducing waste gas emissions and heat loss. Avoidance of oxidants also minimizes undesirable oxidation of components such as metal powders. PHAs are also compatible with a reducing or inert atmosphere, when exposure to such atmospheres is desired. For example, the use of reducing atmospheres is advantageous when using metal oxides or mixtures comprising metal oxides.

In general, avoidance of the need for protective atmospheres or other gases simplifies the process and protects the constituent materials. The rate of decomposition of the PHA can be controlled more easily than the combustion of other binding materials. Combustion requires diffusion of combustion product from the burning binder and diffusion of oxygen to it entail process control and other complexities that are obviated by the use of the PHA system. In other words, the unpredictable results of combustion are avoided since oxygen penetration into the powder-containing shape is no longer required. The PHA system also avoids carbon residues found in other binder systems containing polyolefin or polystyrene materials, thereby leading to fewer faults and greater strength in the final products.

PHAs may also be removed using a solvent process. A variety of application and processing options are provided, since a range of solvents for PHAs are available. The solvency characteristic of PHAs also allows for their removal from malformed compacts, unused tape, and other process waste, thereby reducing wastage. In addition, the PHAs are made from renewable resources and degradable by enzymatic action produced by microorganisms in, for example, composting systems, providing another means of disposal of waste material.

Preferred applications include the manufacture of ceramics, metal coatings, conductive coatings, lacquers, capacitors, superconductors, and automotive parts.

In one embodiment, an "ink" or "lacquer" containing low melting temperature and conducting metals or metal oxides can be applied above the melting point of the polymer and the "ink" allowed to solidify if desired to permit additional production steps. The ink and substrate can then be brought to the decomposition temperature of the PHA at which point the PHA decomposes leaving a dense conductive strip. Alternatively, a metal powder/PHA mixture can be applied as a coating or lacquer above the melting temperature of the PHA, allowed to solidify and the PHA removed by thermal decomposition. The use of solvent-based PHA binder formulations will give similar flexibility including the use of aqueous latexes.

In another embodiment, a PHA form suitable for extrusion molding can be used as a container for powdered materials, such as the 1-2-3 superconductor, wherein the PHA is removed by thermal decomposition after shaping the powdered material. A particularly useful example is in the manufacture of superconducting tapes or wires using yttrium oxide, barium carbonate, and cupric oxide with subsequent enrichment with oxygen (YBCO). The thin film techniques currently used can only produce YBCO tapes of about one meter in length. The ability to extrude such materials should be useful in manufacturing superconducting films or wires that are hundreds of meters long and commercially suitable.

The present invention can also be used in the manufacturing of capacitors, including multi-layered capacitors. In particular, the present invention can be used as a binder with metal powders used in the manufacturing of capacitor layers. The binder can be mixed with the metal powder and then the binder with the metal powder is pressed to form an anode which is subsequently sintered. During sintering, the binder material will be removed. In such an embodiment, any metal powder conventionally used in the manufacturing of capacitors or parts thereof can be combined with the binder for purposes of forming the anode. Examples include, but are not limited to, aluminum, tantalum, niobium, and other valve metals, alloys thereof, and the like. The present invention can be incorporated into conventional capacitor manufacturing processes, including, but not limited to those described in U.S. Pat. Nos. 6,088,218; 6,088,217; and 6,072,694, all of which are incorporated in their entirety by reference herein.

The low molecular weight PHAs, when used as a binder, provide unexpected properties with respect to the pressed powdered material that has been molded together using the binder of the present invention. In particular, the green strength of the molded material is significantly improved when the low molecular weight PHAs of the present invention are used as compared to higher molecular weight PHAs. In addition, the handling of green strength is significantly improved with the use of the low molecular weight PHA binders of the present invention. Thus, using the low molecular weight PHA binders of the present invention, the molded compositions containing at least one powdered material and the PHAs can achieve and preferably achieve a balance of properties, particularly a balance of green strength with improved handling of green strength. Without wishing to be bound, the amount of PHA binder that is present in the molded composition is any amount that will bind material together and preferably an amount effective in improving one or more properties, such as green strength or the handling strength. Preferably, the amount of PHA binder present is 1% by weight of the composition or less and more preferably 0.75% by weight or less and even more preferably 0.5% or less. A preferred range of PHA binder is from about 0.20 to about 1 wt % and more preferably 0.375 to about 0.75% by weight based on the total weight of the composition.

The present invention will be further clarified by the following examples, which are intended to be purely exemplary of the present invention.

EXAMPLE 1

Controls

Ancorsteel 1000B stainless steel powder was combined with 0.75% and 0.50% Accrawax, (ethylene bis stearamide obtained from Lonza) in a high-speed blender; these products are designated examples 1 and 1a respectively. The material was poured into a rectangular mold of dimensions 1.25 inches by 0.5 inch by 0.25 inch and compressed at a pressure of 30 tons per square inch for 2 seconds. The resultant green compacted metal specimens were tested for density and transverse rupture (three point bend 0.5 inch centers). The samples were then submitted to a sintering process in a deammoniating furnace (atmosphere 75% hydrogen and 25% nitrogen) for 30 minutes at 2050–2060° C. The sintered samples were examined for surface voids and fissures, and submitted to transverse rupture using a three point bend test. Green strength was measured according to ASTM B312-96.

EXAMPLES 2 to 7

Polyhydroxybutyrate (PHB)

Polyhydroxybutyrate samples having a variety of molecular weights were prepared by acid hydrolysis of fermented and solvent extracted polyhydroxybutyrate having a molecular weight of 600,000. In more detail, PHB (50 g) obtained from Aldrich having a molecular weight by GPC of 600,000 was dissolved in dioxane (100 ml) under reflux conditions. Concentrated hydrochloric acid (10 ml) was added and the solution heated under reflux for 40 minutes. The solution was cooled to room temperature and the residual hydrochloric acid neutralized with aqueous sodium carbonate. The polymer recovered had a molecular weight by GPC of 20,000. The above reaction was repeated with the reflux time extended to 2 hours and a polymer with a GPC molecular weight of 5,000 was obtained PHO having a distribution of 80% 3-hydroxyoctenoate units, 5% 3-hydroxydecanoate units and 15% 3-hydroxyhexanoate units and having a molecular weight GPC of 600,000 was dissolved in dioxane (100 ml) under reflux conditions. Concentrated hydrochloric acid (10 ml) was added and the solution heated under reflux for 40 minutes. The solution was cooled to room temperature and the residual hydrochloric acid neutralized with aqueous sodium carbonate. The polymer recovered had a molecular weight by GPC of 20,000. The polyhydroxybutyrate was combined with Ancorsteel 1000B and tested in a similar manner described for example 1. The level and molecular weight of the polyhydroxybutyrate samples is described in the following Table 1:

TABLE 1

| Example | Molecular weight | Percent loading (wt %) |
| --- | --- | --- |
| 2 | 600,000 | 1% |
| 3 | 600,000 | 0.75% |
| 4 | 600,000 | 0.5% |
| 5 | 20,000 | 0.75% |
| 6 | 5,000 | 0.75% |
| 7 | 5,000 | 0.5% |

EXAMPLES 8 to 12

Polyhydroxyoctanoate (PHO)

Polyhydroxyoctanoate samples having a variety of molecular weights were prepared by acid hydrolysis of fermented and solvent extracted polyhydroxyoctanoate having a molecular weight of 130,000. The polyhydroxyoctanoate was combined with Ancorsteel 1000B and tested in a similar manner described for example 1. The level and molecular weight of the polyhydroxyoctanoate samples is described in the following Table 2:

TABLE 2

| Example | Molecular weight | Percent loading (wt %) |
|---------|------------------|------------------------|
| 8       | 130,000          | 0.75%                  |
| 9       | 130,000          | 0.375%                 |
| 10      | 20,000           | 0.75%                  |
| 11      | 20,000           | 0.5%                   |
| 12      | 20,000           | 0.375                  |

The results for Examples 1–12 are as follows:

TABLE 3

| Example | Green strength psi | Density g/cc | Transverse rupture ksi | Handling of Green strength |
|---------|--------------------|--------------|------------------------|----------------------------|
| Control no binder | 2362 | 6.52 | 58 | Poor Very brittle |
| 1 control Accrawax | 1408 | 6.69 | 57 | Good |
| 1a control Accrawax | 875 | Not measured | Not measured | Poor Very brittle |
| 2 | 280 | 6.27 | Not measured | Poor |
| 3 | 947 | 6.50 | Not measured | Moderate |
| 4 | 1203 | 6.50 | Not measured | Moderate-good |
| 5 | 1581 | 6.59 | 60 | Good-very good |
| 6 | 1564 | 6.73 | 56 | Good-very good |
| 7 | 1899 | 6.60 | 57 | Very good |
| 8 | 1371 | 6.56 | Not measured | Good |
| 9 | 1459 | 6.53 | Not measured | Very good |
| 10 | 1527 | 6.67 | 60 | Good-very good |
| 11 | 1603 | 5.56 | Not measured | Very good |
| 12 | 1859 | 6.53 | Not measured | Very good |

These results demonstrate that PHA binders with molecular weights below 100,000 provide green strength products with a higher flexural strength. However there is a sacrifice in actual handling strength with the compressed Ancorsteel 1000B being extremely brittle and prone to breakage even under mild handling conditions. Acerawax, at low binder levels, does not show the same improved green strength and handling properties that are observed with polyhydroxyalkanoates. A reduction in molecular weight of the polyhydroxyalkanoate also contributes to improve green strength and handling characteristics.

Other embodiments of the present invention will be apparent to those skilled in the art from consideration of the specification and practice of the invention disclosed herein. It is intended that the specification be considered as exemplary only, with a true scope and spirit of the invention being indicated by the following claims and equivalents thereof.

What is claimed is:

1. A composition comprising at least one powdered material admixed with at least one thermally decomposable polyhydroxyalkanoate having a molecular weight of from about 500 to less than 10,000.

2. The composition of claim 1, wherein the molecular weight is from about 1,000 to about 5,000.

3. The composition of claim 1, wherein the molecular weight is from about 1,000 to about 3,000.

4. The composition of claim 1, wherein the polyhydroxyalkanoate is a polymer of one or more subunits having the chemical formula:

—OCR$^1$R$^2$(CR$^3$R$^4$)$_n$CO— wherein N is 0 or an integer, and wherein R$^1$, R$^2$, R$^3$, or R$^4$, which is the same or different, is selected from a saturated or unsaturated hydrocarbon radical; a halo- or hydroxy-substituted radical; a hydroxy radical; a halogen radical; a nitrogen-substituted radical; an oxygen-substituted radical; or a hydrogen atom.

5. The composition of claim 1 wherein the polyhydroxyalkanoate is selected from poly(3-hydroxybutyrate), poly 3-hydroxybutyrate-co-3-hydroxyvalerate, poly 3-hydroxybutyrate-co-4-hydroxybutyrate, poly 3-hydroxybutyrate-co-3-hydroxyhexanoate, poly 3-hydroxybutyrate-co-3-hydroxyheptanoate, or poly 3-hydroxybutyrate-co-3-hydroxyoctanoate.

6. The composition of claim 1, wherein the polyhydroxyalkanoate is produced by a microbial fermentation process.

7. The composition of claim 1, wherein the polyhydroxyalkanoate is produced by a genetically engineered plant crop system.

8. The composition of claim 1, wherein the polyhydroxyalkanoate is produced by a chemical polymerization reaction.

9. The composition of claim 8, wherein the chemical polymerization reaction is a ring opening polymerization reaction.

10. The composition of claim 1, wherein the polyhydroxyalkanoate comprises a polymer selected from the group consisting of poly(lactic acid)s, poly(glycolic acid)s, 3-hydroxyacids, 4-hydroxyacids, 5-hydroxyacids, copolymers thereof, and blends thereof.

11. The composition of claim 1, wherein the powdered material is selected from glass, ceramics, metals, alloys, or mixtures thereof.

12. The composition of claim 11, wherein the powdered material is present in an amount of from about 50% to about 99.999% by weight based on total dry weight of the composition.

13. The composition of claim 11, wherein the powdered material is a ceramic present in an amount of from about 70% to about 99.999% by weight based on total dry weight of the composition.

14. The composition of claim 1, wherein the polyhydroxyalkanoate comprises a mixture of thermally degradable polyhydroxyalkanoates.

15. The composition of claim 1, further comprising at least one thermally degradable polymer other than polyhydroxyalkanoate.

16. The composition of claim 15, wherein the thermally degradable polymer is selected from polycarbonates, polyolefins, polystyrenes, polyacetals, waxes, or combinations thereof.

17. The composition of claim 1, wherein the polyhydroxyalkanoate is dispersed in water.

18. The composition of claim 1, wherein the polyhydroxyalkanoate is dissolved in a solvent or a mixture of solvents.

19. A method of forming a shaped product, the method comprising:
    molding a composition comprising a powdered material admixed with at least one thermally decomposable polyhydroxyalkanoate of claim 1 or a solution thereof to form the shaped product.

20. The method of claim 19, wherein the powdered material is selected from glass, ceramics, metals, alloys, or mixtures thereof.

21. The method of claim 19, wherein the method of forming shaped products is selected from slip casting, tape casting, extrusion, injection molding, dry pressing, or screen printing.

22. The method of claim 19, further comprising heating the shaped product to remove essentially all of the polyhydroxyalkanoate from the product.

23. A molded article formed by a method comprising: molding a composition comprising a powdered material admixed with at least one thermally decomposable polyhydroxyalkanoate of claim 1 or a solution thereof.

24. A molding composition comprising 70 wt % to 99.9 wt % of an inorganic material and 0.1–30 wt % of at least one polyhydroxyalkanoate having a molecular weight from 500 to less than 10,000 and the chemical formula:

where n is 0 or an integer, and wherein $R^1$, $R^2$, $R^3$, and $R^4$, which are the same or different, are selected from saturated or unsaturated hydrocarbon radicals; halo, hydroxy, oxygen or nitrogen substituted radicals, or hydrogen atoms.

25. The molding composition of claim 24, wherein the inorganic material comprises iron, chromium, copper, nickel, aluminum, titanium, silicon oxide, silicon carbide, silicon nitride, or aluminum nitride.

26. The molding composition of claim 24, wherein the polyhydroxyalkanoate is polyhydroxybutyrate.

27. The molding composition of claim 24, wherein the polyhydroxyalkanoate is a copolymer of 60–99 wt % 3-hydroxybutyric acid and 1–40 wt % 3-hydroxyvaleric acid.

28. The molding composition of claim 24, wherein the polyhydroxyalkanoate is a copolymer of 60–99 wt % 3-hydroxybutyric acid and 1–40 wt % 4-hydroxybutyric acid.

29. The molding composition of claim 24, wherein the polyhydroxyalkanoate is poly 3-hydroxyoctanoate.

30. The molding composition of claim 24, wherein the polyhydroxyalkanoate is a copolymer containing at least 10 wt % by molar mass hydroxyoctanoate groups randomly distributed through the polymer chain.

31. The molding composition of claim 24, wherein the polyhydroxyalkanoate has a molecular weight of from about 1,000 to about 9,000.

32. The molding composition of claim 24, wherein the polyhydroxyalkanoate has a molecular weight of from about 1,000 to less than about 3,000.

33. The molding composition of claim 24, wherein the polyhydroxyalkanoate has an end chain functionality selected from vinyl, carboxylic acid, carboxylic acid ester, acetate, butyrate, propanoate, primary, secondary or tertiary alcohol, amide, or polyhydric alcohol.

34. The molding composition of claim 24, wherein the polyhydroxyalkanoate is obtained by the thermolysis of a polyhydroxyalkanoate having a molecular weight greater than 80,000.

35. The molding composition of claim 24, wherein the polyhydroxyalkanoate has the structure $R^5CH=CH_2(CH_2)_{n-1}CO[OCHR^6(CH_2)_n CO]_pOH$, where p is from 5 to 1000, n is 0 or an integer, and $R^5$ and $R^6$, which are the same or different, is selected from saturated or unsaturated hydrocarbon radicals; halo, hydroxy, oxygen or nitrogen substituted radicals, or hydrogen atoms.

36. The molding composition of claim 24, wherein the polyhydroxyalkanoate is obtained by the acid hydrolysis of a polyhydroxyalkanoate having a molecular weight of greater than 80,000.

37. The molding composition of claim 24, wherein the polyhydroxyalkanoate is obtained by the acid hydrolysis of a polyhydroxyalkanoate having a molecular weight of greater than 80,000 in the presence of an alcohol, diol or polyhydric alcohol.

38. The molding composition of claim 24, wherein the polyhydroxyalkanoate has the structure $H[OCHR^7(CH_2)_n CO]_pOR'$, wherein R' is derived from a monohydric alcohol or a polyhydric alcohol and wherein p is from 5 to 1000, n is 0 or an integer, and $R^7$ is selected from saturated or unsaturated hydrocarbon radicals; halo, hydroxy, oxygen or nitrogen substituted radicals, or hydrogen atoms.

39. The molding composition of claim 24, wherein the polyhydroxyalkanoate is obtained by the acid hydrolysis of a polyhydroxyalkanoate having a molecular weight of greater than 80,000 in the presence of an aliphatic carboxylic acid.

40. A molding composition of claim 24, wherein the polyhydroxyalkanoate has the structure $R''CO[OCHR^8(CH_2)_n CO]_pOH$, wherein R'' is derived from a carboxylic acid having 1 to 20 carbon atoms and wherein p is from 5 to 1000, n is 0 or an integer, and $R^8$ is selected from saturated or unsaturated hydrocarbon radicals; halo, hydroxy, oxygen or nitrogen substituted radicals, or hydrogen atoms.

41. The molding composition of claim 24, wherein the polyhydroxyalkanoate is a block polymer containing at least 20 wt % of a polyhydroxyalkanoate segment, and at least one polyalkylene glycol segment where the polyalkylene glycol is selected from one or more repeat units of ethylene oxide, propylene oxide or butylene oxide or mixtures of ethylene oxide, propylene oxide and/or butylene oxide.

42. A thermally decomposable polyhydroxyalkanoate having at least one of the terminal end groups selected from:
   a) $-CO-CH=CR^9R^{10}$;
   b) $-OR^{11}$;
   c) $-COOR^{12}$,
   d) $-COR^{13}$; or
   e) $-O^-M^+$
wherein $R^9$, $R^{10}$, $R^{11}$, $R^{12}$, or $R^{13}$ which are the same or different, represents saturated or unsaturated hydrocarbon radicals, halo- or hydroxy- substituted radicals, hydroxy radicals, nitrogen-substituted radicals, oxygen-substituted radicals, or a hydrogen atom, with the proviso that $R^{11}$ and $R^{12}$ are not a hydrogen atom, and $R^{13}$ is not a hydroxy radical, and $M^+$ is a counter ion.

43. The thermally decomposable polyhydroxyalkanoate of claim 42, wherein said second terminal end group is $-CO-CH=CR^9R^{10}$.

44. The thermally decomposable polyhydroxyalkanoate of claim 42, wherein said second terminal end group is $-OR^{11}$.

45. The thermally decomposable polyhydroxyalkanoate of claim 42, wherein said second terminal end group is $-COOR^{12}$.

46. The thermally decomposable polyhydroxyalkanoate of claim 42, wherein said polyhydroxyalkanoate has a molecular weight of from about 500 to less than 70,000.

47. The thermally decomposable polyhydroxyalkanoate of claim 42, wherein said polyhydroxyalkanoate has a molecular weight of from about 10,000 to about 1.5 million.

48. A composition comprising at least one powdered material admixed with the thermally decomposable polyhydroxyalkanoate of claim 42.

49. A method of making the thermally decomposable polyhydroxyalkanoate of claim 42, comprising subjecting a thermally decomposable polyhydroxyalkanoate having a molecular weight of greater than 70,000 to an acid hydrolysis.

50. A method of making the thermally decomposable polyhydroxyalkanoate of claim 42, comprising subjecting a thermally decomposable polyhydroxyalkanoate having a molecular weight of greater than 70,000 to a heat profile to decompose the polyhydroxyalkanoate.

51. The method of claim 50, wherein said thermolysis occurs at a temperature of from about 195° C. to about 250° C. at atmospheric pressure.

52. The method of claim 51, wherein said thermolysis occurs for a period of from about 15 seconds to about 4 hours.

53. The method of claim 49, wherein said thermally decomposable polyhydroxyalkanoate is a dried biomass containing inorganic salts.

54. The method of claim 49, wherein said thermally decomposable polyhydroxyalkanoate is a dried biomass washed free of water soluble salts.

55. The method of claim 49, wherein said thermally decomposable polyhydroxyalkanoate is a purified polymer.

56. The method of claim 49, wherein the yield is greater than 80% by weight based on the polyhydroxyalkanoate content.

57. The method of claim 50, wherein said method occurs in an inert gas.

58. The method of claim 50, wherein said method occurs in a reducing atmosphere.

59. The method of claim 50, wherein said thermally decomposable polyhydroxyalkanoate is a dried biomass containing inorganic salts.

60. The method of claim 50, wherein said thermally decomposable polyhydroxyalkanoate is a dried biomass washed free of water soluble salts.

61. The method of claim 50, wherein said thermally decomposable polyhydroxyalkanoate is a purified polymer.

62. A method of claim 49, wherein said acid hydrolysis occurs in the presence of an alcohol, a diol, a polyhydric alcohol, or combinations thereof.

63. The method of claim 49, wherein said hydrolysis occurs in an excess amount of alcohol, dial, thiol, or combinations thereof.

64. The method of claim 63, wherein at least 1% by weight residual alcohol, diol, or polyol remains in the reaction product.

65. The method of claim 57, wherein said inert gas is a nitrogen gas optionally in the presence of an alcohol vapor.

66. The composition of claim 1, wherein said powdered material is a metal powder comprising iron, steel, copper, nickel, tungsten, or combinations thereof and said polyhydroxybutyrate comprises poly 3 hydroxybutyrate or a copolymer of 3 hydroxy butyrate with 3 hydroxyvalerate or 4 hydroxybutyrate.

67. The composition of claim 1, wherein said powdered material is a ceramic powder comprising barium titanate, aluminum hydroxide, alumina, wollastonite, silica, or combinations thereof and said polyhydroxybutyrate comprises poly 3 hydroxybutyrate or a copolymer of 3 hydroxy butyrate with 3 hydroxyvalerate or 4 hydroxybutyrate.

* * * * *

UNITED STATES PATENT AND TRADEMARK OFFICE
CERTIFICATE OF CORRECTION

PATENT NO. : 6,780,911 B2
DATED : August 24, 2004
INVENTOR(S) : Zhong et al.

It is certified that error appears in the above-identified patent and that said Letters Patent is hereby corrected as shown below:

Column 16,
Line 1, "N" should read -- n --.

Column 18,
Line 41, "hvdroxy" should read -- hydroxy --.

Column 20,
Line 7, "dial" should read -- diol --.

Signed and Sealed this

Twenty-eighth Day of December, 2004

JON W. DUDAS
*Director of the United States Patent and Trademark Office*